United States Patent
Sarin

(10) Patent No.: US 10,346,825 B2
(45) Date of Patent: Jul. 9, 2019

(54) PRESSURE SENSITIVE DEVICE CASINGS TO ENABLE DEVICE FUNCTIONALITY

(71) Applicant: PAYPAL, INC., San Jose, CA (US)

(72) Inventor: Pankaj Sarin, New Delhi (IN)

(73) Assignee: PAYPAL, INC., San Jose, CA (US)

( * ) Notice: Subject to any disclaimer, the term of this patent is extended or adjusted under 35 U.S.C. 154(b) by 36 days.

(21) Appl. No.: 15/193,643

(22) Filed: Jun. 27, 2016

(65) Prior Publication Data

US 2017/0371468 A1    Dec. 28, 2017

(51) Int. Cl.
*G06F 3/043* (2006.01)
*G06Q 20/32* (2012.01)
*H04B 1/3888* (2015.01)
*G06F 3/0487* (2013.01)

(52) U.S. Cl.
CPC ......... *G06Q 20/322* (2013.01); *G06F 3/0487* (2013.01); *H04B 1/3888* (2013.01)

(58) Field of Classification Search
CPC .................................................. G06F 3/044
See application file for complete search history.

(56) References Cited

U.S. PATENT DOCUMENTS

| | | | | |
|---|---|---|---|---|
| 2012/0260220 A1* | 10/2012 | Griffin | ............ | G06F 3/033 715/863 |
| 2014/0071077 A1* | 3/2014 | Kang | ............ | G06F 3/044 345/173 |
| 2016/0063828 A1* | 3/2016 | Moussette | ............ | G08B 6/00 340/540 |
| 2016/0259497 A1* | 9/2016 | Foss | ............ | G06F 3/0482 |
| 2017/0012591 A1* | 1/2017 | Rider | ............ | H03G 3/3005 |
| 2017/0018018 A1* | 1/2017 | Akpala | ............ | G06Q 30/0625 |

* cited by examiner

*Primary Examiner* — Kent W Chang
(74) *Attorney, Agent, or Firm* — Haynes and Boone, LLP

(57) ABSTRACT

There are provided systems and methods for pressure sensitive device casing to cause device functionality. A computing device, such as a mobile smart phone, may include one or more pressure sensor devices mounted within, surrounding, or nearby structural components of the computing device, such as a device casing. A user may apply pressure input to the structure of the computing device, for example, through touch and force of touch to the device, where the pressure sensor may detect a presence and location of the input. The computing device may include a transaction processing application, where the input may be received during use of the application. The pressure of the input may further define the input for the application. For example, an input with a first pressure may cause a first process to be initiated, while a second pressure may cause a second process to be initiated.

20 Claims, 7 Drawing Sheets

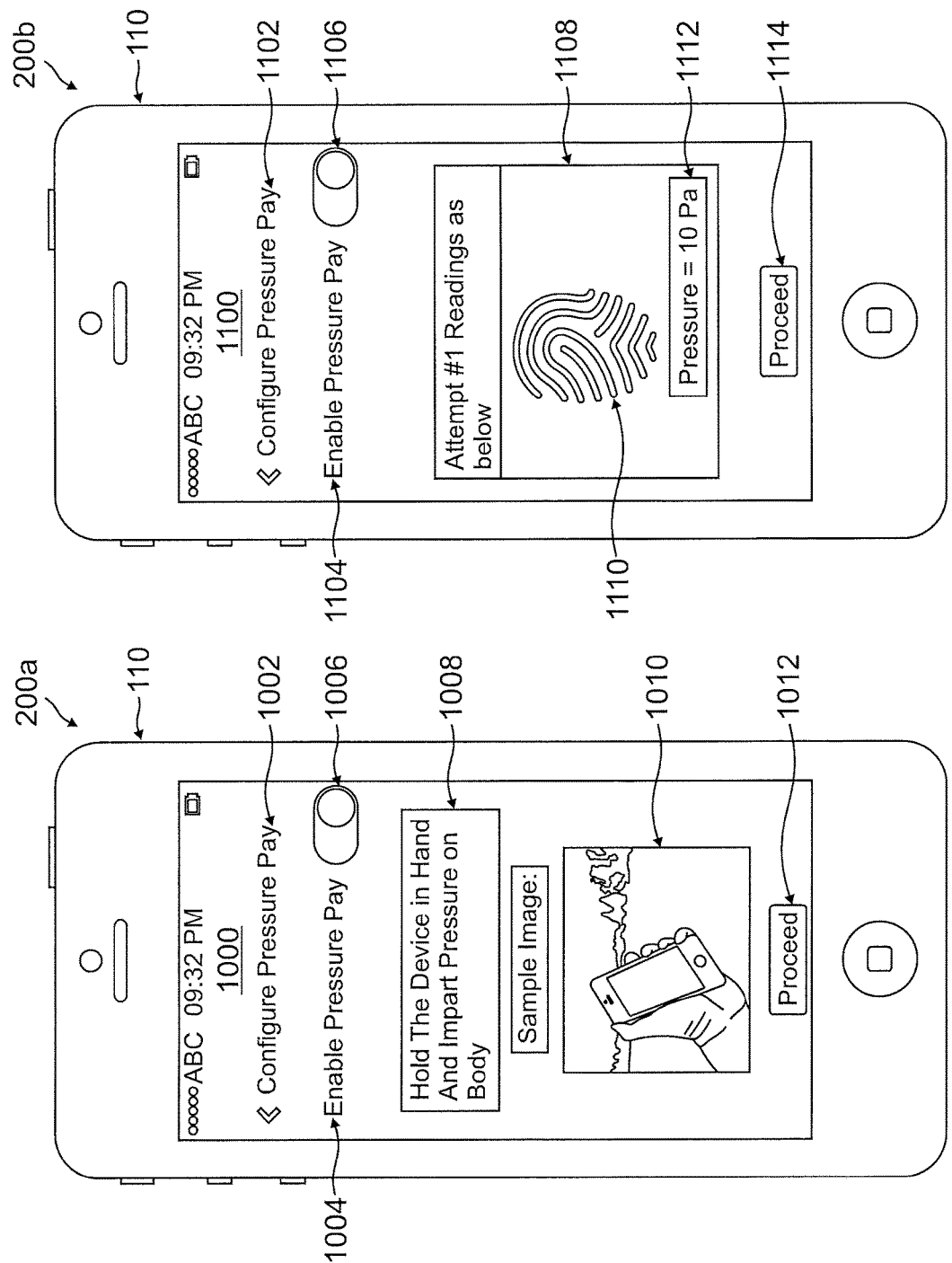

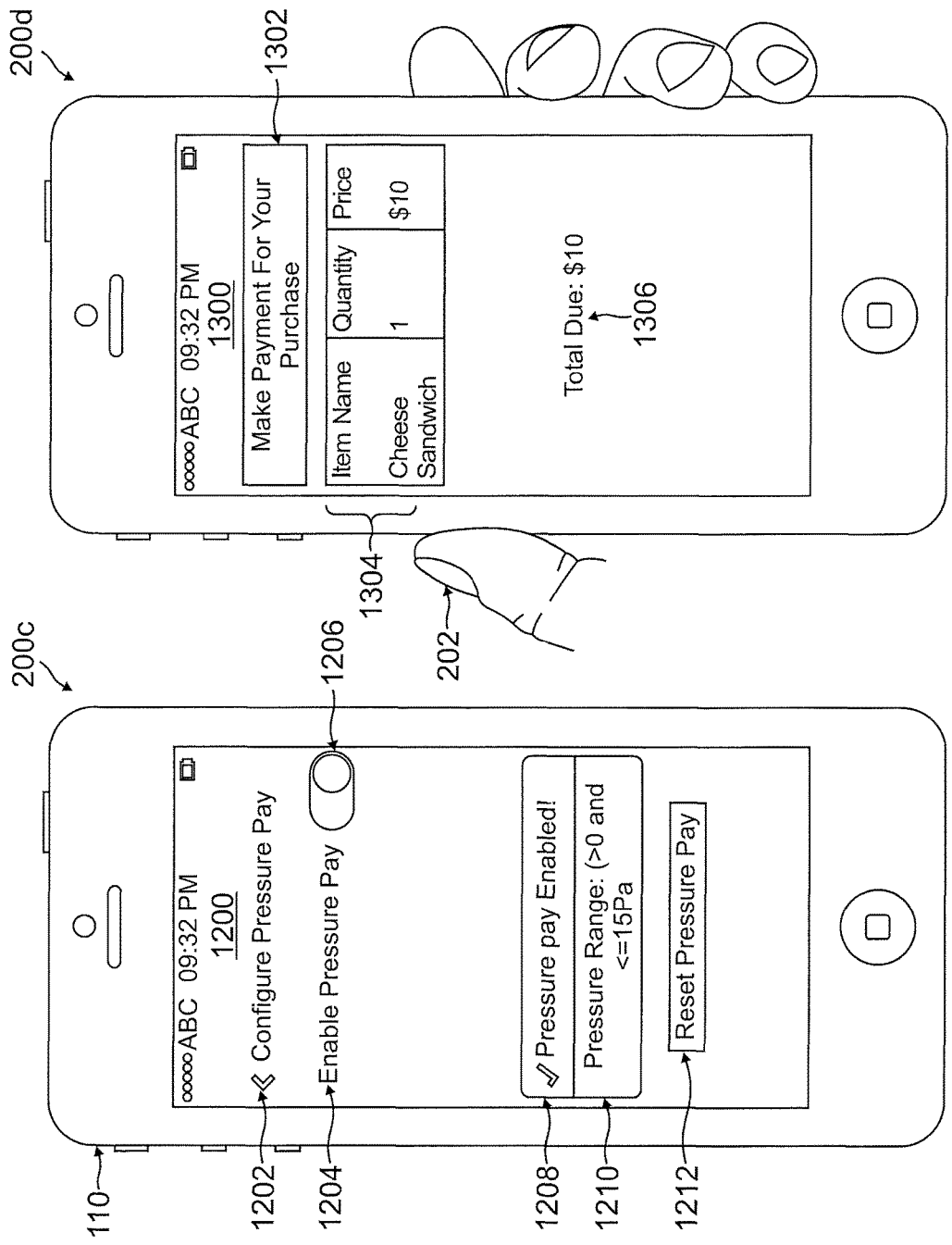

PRESSURE SENSITIVE DEVICE CASINGS TO ENABLE DEVICE FUNCTIONALITY

TECHNICAL FIELD

The present application generally relates to measuring pressure applied to devices and more specifically to pressure sensitive device casings to enable device functionality based on pressures applied to the casings.

BACKGROUND

Mobile computing devices may allow for a variety of inputs through various input mechanisms, including touch screen inputs, keypads and other device buttons, audio input devices, and/or imaging/video input devices. However, such features generally do not relate to the way a user holds a device. Thus, a user often is required to utilize fingertip, voice, and/or image/video input in order to control the device and/or provide commands to the device. In this regard, the user often requires multiple inputs in order to access various device functionalities or to perform different device actions.

Mobile computing devices may also offer transaction processing services to one or more users, which may allow the users to provide mobile and/or digital payments. For example, an application executing on a mobile phone may allow a user to send and receive money, and/or pay for items. However, the applications may require multiple inputs to access options within the payment application and/or provide an amount for payment for a transaction. For example, while paying for the purchases, mobile device users are required to perform specific steps to perform transaction processing. These include, tapping on the application, viewing the mobile device's screen, making selections and/or entering information, and authorizing the transaction, such as by tapping on buttons. Thus, this process is time consuming and may lead to poor user experiences.

BRIEF DESCRIPTION OF THE DRAWINGS

FIG. 2A is an exemplary setup interface for a pressure detection and/or payment application to utilize pressure inputs for execute a process, according to an embodiment;

FIG. 2B is an exemplary setup interface for setting a pressure input for use with a process for a pressure detection and/or payment application, according to an embodiment;

FIG. 2C is an exemplary setup interface for establishing a pressure input for use with a process for a pressure detection and/or payment application, according to an embodiment;

FIG. 2D is an exemplary payment interface utilizing a pressure input to execute a process in a payment application, according to an embodiment;

Figure 1:
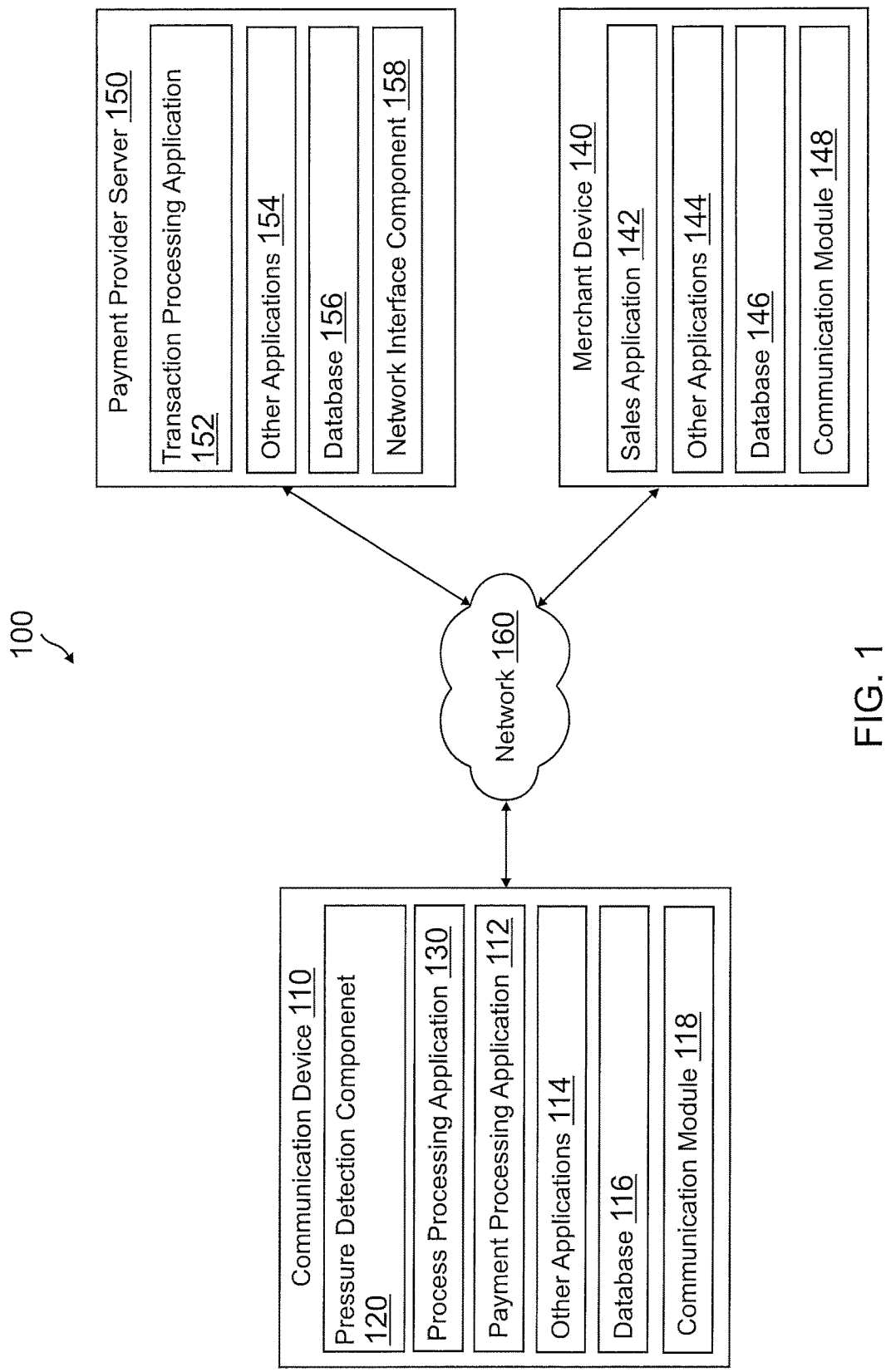
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for pressure sensitive device casings to cause or enable various device functionalities or actions based on different pressures applied to the casing. Systems suitable for practicing methods of the present disclosure are also provided.

A computing device may include a pressure sensitive casing, such as structural body, screen, attachable casing (e.g., a device holder, protective sleeve, connectable protector, or other casing type device), or other structural component, including connectable components and/or connected devices (e.g., an associated wearable computing device). The pressure sensitive component may be configured to detect touch and pressure inputs, for example, through one or more of a piezoresistive device, a piezoelectric device, a mechanical resistive device, an electromagnetic device, and a capacitive variance device, where the device may correspond to a separate or integrated sensor in the pressure sensitive component. Thus, the pressure sensitive component of the computing device may include particular electronic components and devices to detect a presence and location of a touch or other pressure input (e.g., through a finger, palm, hand, or other appendage, or using another object, such as a stylus) to the pressure sensitive device. Additionally, the pressure sensitive device may be configured to detect an amount of pressure provided with the pressure inputs. For example, the pressure sensitive device may be configured with a sensitivity setting and associated components to detect pressure applied to the pressure sensitive device during the pressure input. The pressure may be defined in pascal (Pa), pound-force per square inch (Psi), or other pressure defining unit that determines an amount of force applied to an area (e.g., force per unit of area, include newton per square meter). The pressure sensitive device may include one or more pressure processing applications and additional device components that may detect and read the pressure inputs and pressure amount of each of the pressure inputs. The application(s) and the component(s) may further provide the information to additional processing system of the computing device for use in operating systems, applications, and application interfaces of the computing device.

In this regard, the computing device may further include a payment application or more generally a transaction processing application, which may be configured to send and receive payments to another party, such as another user and/or a merchant. The payment application may be associated with a payment provider, such as PayPal® or other online payment provider service, which may provide payments and other services on behalf of user, merchants, and other entities. The payment application may execute on the computing device for a user or a merchant, and may provide various functionalities and processes to the user and/or merchant. For example, a user may utilize the payment application to send and/or receive payments between the user and another user/merchant. The user may wish to provide a payment for a transaction with a user/merchant, transfer money to another family/friend, engage in a transaction previously generated and provided to the payment application, initiate a transaction with another entity, or perform another process. The merchant may similarly send and/or receive payments between the merchant and another user/merchant, which may include receiving payment for transactions, providing payments to employees and/or for business expenses, transfer money between accounts, or perform further transaction processing. Other entities, such as charitable organizations and businesses may also utilize the payment application, for example, to receive donations from various parties and/or pay business expenses. The online payment provider may be utilized to perform such transaction processing. Additionally, the online payment provider may provide payment accounts and digital wallet services, which may offer financial accounts to send, store, and receive money, process financial instruments, and/or provide transaction histories. The online payment provider may offer further services, such as extension of credit, credit history review, account establishment and maintenance, and other financial and personal services.

The payment application may therefore provide one or more processes and features for use of the financial and personal services provided by the online payment provider. The user of the computing device (e.g., a single or group of users, a merchant, or other entity) may utilize the payment application and/or another application executing on the computing device through various input devices of the computing device, including a keyboard, mouse, microphone, touchscreen, and/or other device capable of receiving input from the user. In this regard, a structural component of the user device, such as a body, casing, or other surface component, including a circumferential body, back, or front of the computing device, may be used as an input device to receive pressure inputs (e.g., pressure inputs having a pressure and/or location) to initiate and/or execute processes and features of the computing device's application. In various embodiments, the structural component may further be used to output information, for example, through haptic feedback, embedded LEDs or other visual feedback/output device, or other output mechanism. The user may conventionally use the features of the device's application through use of a keyboard, mouse, touchscreen interface, microphone, or other input device, such as a selection of a menu option or interface field with a finger tap (or stylus type device) and other finger motions, movement of a mouse, typing on the keyboard, etc. Such inputs may allow the user to enter information, make selections, and initiate/engage in processes of the application. The inputs may be general, pre-configured for the payment application, or may be set by the user using the payment application or system operating configurations of the device's operating system. Additionally, the user may utilize the structural body and a pressure sensitive input device to provide further input to the device application. The computing device may correspond to a mobile computing device, such as a mobile smart phone, tablet, laptop, etc., or may correspond to a home computing device having attachable pressure detection devices.

In this regard, the user may further utilize a pressure input (e.g., tap, squeeze, holding motion, etc.) to provide further input to the computing device. The pressure and location of the pressure/input may provide an additional data point that further specifies the action to take within the payment application. For example, an application may receive general input through other input devices, such as a mouse, keyboard, touchscreen interface, etc. However, using a pressure sensitive component of the computing device, a pressure of an input applied to or imparted on the structure of the compute device may provide further information and inputs, such as selection of an executable process or task, initiation of such a process or task, or other associated input. For example, one or more applications of the computing device may be configured to receive input through the pressure sensitive structural component of the computing device. A payment application may define a process or action executable when a pressure input is entered to the structural component. Thus, if the user presses on the structural component with a certain pressure, then the input may execute a process within the payment application. Such process may correspond to an automatic payment for received transaction information with another user or a merchant. The executable process linked to a pressure input may correspond to an acceptance of displayed information (e.g., application terms of service, a transaction, interface navigation, etc.). The amount of pressure applied with the input may also affect selection and execution of the corresponding process or action. For example, the input may be required to be within a certain pressure range, where an applied pressure input to the structural component of the computing device is required to be within the pressure range or the corresponding process/action will not be initiated and/or executed. In other embodiments, the application may define two or more associated pressure inputs, which each pressure input is associated with a set pressure amount and/or pressure amount range that may define the type of input and associated executable process/action. In such embodiments, the pressure input applied to the structural component of the computing device may have at least a first input setting and a second input setting (or further input settings, such as a third, fourth, nth pressure setting), where the first input corresponds to a pressure input having a first pressure level or amount that is less, more, or otherwise different than a second pressure level of the second pressure input. The application (e.g., the payment application) may specify the amount of pressure input for each input, for example, by notifying the user of the amount of pressure to apply (e.g., number of Pa/Psi) or demonstrating the amount to the user through a tutorial interface. The application may also allow the user to enter the pressure amount the user has selected or would prefer to designate for a pressure input.

Pressure inputs may also be associated with further information that defines the pressure input, for example, location of the pressure input on the pressure sensitive structural component, number of pressure inputs at the same time or in sequence, and/or length of a pressure input. Thus, the pressure input may depend on how a user holds a device or taps a device, for example, through a number of fingers and/or location of each finger, palm placement, hand motion, or other use of an appendage (e.g., legs, feet, head) or other device (e.g., a stylus, etc.) to interact with the structural component of the computing device. Moreover, where the casing or other structural component of the computing device is capable of reading a fingerprint, such as a wrap-around screen of a computing device that connects to a circumferential body or where a fingerprint imaging or other biometric detection device is embedded in the structure of the computing device, the fingerprint and/or portion of the fingerprint (e.g., dependent on how a user holds a device) may also be used as a further data point for the pressure input. In other embodiments, the fingerprint may be required to access the pressure inputs (e.g., as an authentication mechanism), or may be required to select from a set of pressure inputs (e.g., pressure inputs associated with a certain user, where each fingerprint causes selection and retrieval of the corresponding user's data set of pressure inputs). Thus, the pressure input may also utilize a biometric (e.g., fingerprint) to unlock the computing device and/or initiate the process/action.

The application may further specify the action taken by each pressure input (e.g., acceptance of a transaction, initiation of transaction processing, cancellation of a transaction, addition of a tip amount, selection of a payment amount, an accept/decline option, an interface navigation input, etc.). For example, the user of the computing device may configure the payment application with a pressure amount for each input, where the pressure amount for each input each executes a different application process or action established by the payment application. In this regard, the user may access a configuration menu to establish pressure inputs and pressure amount amounts for inputs, where the pressure inputs having the pressure amount cause execution of an action within an application. As discussed, inputs may be associated with multiple actions depending on the amount of pressure applied with the pressure input, location of the pressure input, number of pressure inputs at once or over a time period, length of input, or other data point for the pressure input. Thus, the payment application may include a preconfigured action where squeezing the structural component of the computing device with a first pressure amount may accept a financial transaction currently displayed and/or received by the payment application and initiate a payment process for the financial transaction. Where multiple pressure inputs are to be utilized with the payment amount, the payment application may allow the user to set processes for execution using two or more pressures. For example, a first pressure amount (as well as other input data point) of the pressure input may accept the financial transaction and initiate transaction processing, while a second pressure amount of the same, similar or different pressure input (e.g., based on a different input data point, for example, a different placement of a hand while holding the device) may cancel the transaction or transaction processing and not issue a payment for the transaction. The user may configure the amount of pressure for each pressure input entered using the configuration menu of the application with the structural component. For example, using a setup/configuration process, the user may select a first process/action (e.g., acceptance of the transaction) and enter a pressure amount by applying the pressure to the structural component (e.g., 15 Pa). The user may then further select a second process/action (e.g., rejection of the transaction) with the amount of pressure to use for rejection of the transaction (e.g., 30 Pa). Moreover, in certain embodiments, the pressure input may be pressure amount independent, so that an action is executed based on the pressure (e.g., any pressure) detected exerted by the user on a specific (or any pressure sensitive) portion of the device casing, a corresponding action may be initiated or performed. As a result, actions may be performed using just a single hand of the user and without the need for the user to enter additional data or information on the device.

The configuration setup may utilize a plurality of pressure inputs (e.g., "squeezes," "holding," or "taps") to establish each pressure amount for different actions taken with the pressure input to the structural component of the device in order to establish a set pressure amount for the pressure input or a range of pressure amount for the pressure input for each action initiated or executed with the pressure input. In this regard, for a first pressure input that accepts and processes a transaction, the user may "squeeze" or otherwise hold the structural component with the desired pressure amount for two or more times to establish a variance in the pressure amount for the first pressure input. Similarly, the user may execute the same process to establish a second pressure input for use to reject a transaction. In other embodiments, the payment application may include a preconfigured or adjustable variance for the pressure input (e.g., 10 Pa difference from the selected pressure amount). Thus, the user may enter one or more pressure inputs having the same or similar pressure amounts, where the variance is automatically applied to the selected pressure amount in order to allow for different pressure amounts of a pressure input within an acceptable range of error by the user.

As discussed herein, the user may establish actions for a set of pressure inputs, or a pressure input having multiple data points, for the payment application, where each of the inputs is associated with an amount or degree of pressure the user applies to the structural component of the computing device. The actions may be selected from a menu or otherwise entered to the payment application (e.g., recording an action taken by a user, entry of computer code to a configuration process, etc.). Various selectable actions may include a payment acceptance, a payment amount, a tip amount, a payment contact (e.g., user or merchant), a transfer request, or other executable action. For example, an action may correspond to processes such as a payment to a user or a merchant, a setup process to configure the payment application, an onboarding process to use features provided by the application, a review process for a transaction, a refund process to provide a refund to a customer, a transaction dispute process, a transfer process to send a fixed amount of funds, a tip process to provide a tip, or an application process to open an application (or display the application on an output display device). Processes and/or actions may also be implemented in other types of applications, including messaging applications, telephonic applications, social networking applications, fitness trackers and applications, media sharing or viewing applications, imaging application (e.g., a camera and associate application), microblogging applications, web browsing applications, and/or other types of applications. The action may also correspond to an emergency action to execute in the case of an emergency by the user (e.g., a call or emergency message to an authority entity, such as the police). The emergency action may further include a geo-location of the user determined using the device, such as through a GPS locator of the device. Additionally, the actions may be processes corresponding to a displayed interface of the application or while the application is executing (e.g., in a background of the operating system of the payment application). In other embodiments, the actions may be executed with the device's operating system, including menu selections, locking of interfaces, authentication and/or account access, application execution, or other operating system process.

Thus, when the user enters a pressure input (i.e., exerts pressure) to a structural component of a device, the device may determine the input's data points (e.g., presence, location, length, etc.) and the pressure amount applied during the input. The computing device may utilize a pressure processing application with the structural component to determine the aforementioned information. The information may be provided to the payment application or another application executing on the device. The inputs with their corresponding pressure amounts may be stored to a database of the device and accessible to the payment application. The device may utilize the stored inputs to determine a corresponding process or action the user would like to execute within the payment application using the received input. The computing device may then execute the associated action based on the user's input and amount of pressure for the pressure input. Once the action is determined, the device may interact with another user's device, a merchant device/server, and/or a payment provider server to initiate, engage in, and/or complete a process for the action.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 140, and a payment provider server 150 in communication over a network 160. The user (not shown) may utilize communication device 110 to utilize the various features available for communication device 110, which may include processes and/or applications associated with a pressure sensitive structural component of communication device 110. Communication device 110 may further be utilized to provide payments to one or more entities, such as other users and/or merchants, through an application executing on communication device 110. Various payment processes and features may be initiated, engaged in, and completed using pressure inputs to the structural component of communication device 110. Thus, various pressure inputs having a pressure amount may correspond to actions with merchant device 140 and/or payment provider server 150, such as payments to a merchant corresponding to merchant device 140 using payment provider server 150. In certain embodiments, the user may set additional actions to execute by communication device 110 based on a pressure input having a pressure amount.

Communication device 110, merchant device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with merchant device 140, and/or payment provider server 150. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOGGLE GLASS®), other type of wearable computing device, implantable communication devices, and/or other types of computing devices capable of transmitting and/or receiving data, such as an IPAD® from APPLE®. Communication device 110 may include or be associated with a pressure detection device, such as a connectable wearable device including fitness trackers. For example, in certain embodiments, the pressure sensitive device may be external to communication device 110 and provide input data to communication device 110 (e.g., through a wired connection or wireless connection over short range wireless communications or a network). Although only one communication device is shown, a plurality of communication devices may function similarly.

Communication device 110 of FIG. 1 contains a pressure detection component 120, a pressure processing application 130, a payment processing application 112, other applications 114, a database 116, and a communication module 118. Pressure detection component 120, pressure processing application 130, payment processing application 112, and other applications 114 may correspond to executable processes, procedures, and/or applications with associated hardware. In other embodiments, communication device 110 may include additional or different modules having specialized hardware and/or software as required.

Pressure detection component 120 may correspond to a hardware component of communication device 110 that may be pressure sensitive, or other capable of detecting pressure, for example, pressure imparted to a structure associated with communication device 110, such as a body structure, hardware interface, attachable casing, or connectable device. In this regard, pressure detection component 120 may correspond to a piezoresistive device, a piezoelectric device, a mechanical resistive device, an electromagnetic device, a capacitive variance device, and/or another type of hardware device that may detect a presence and location of a pressure input with a corresponding amount of pressure applied to pressure detection component 120 with the pressure input. Thus, pressure detection component 120 may be pressure sensitive in order to detect an amount of pressure applied during the pressure input. In various embodiments, pressure detection component 120 may correspond to a structural body, such as a circumferential casing or body structure of the device, an attachable casing having embedded or surface mounted pressure sensitive devices, wraparound display screen, such as a display that may further include an output display component to display interfaces and associated data to a user (e.g., an electronic visual display utilized with operating systems and applications of communication device 110). However, in other embodiments, pressure detection component 120 may correspond to a connectable or attached pressure sensitive device, such as a touch pad (e.g., touch pad mouse) having a tactile sensor configured to detect the presence of a pressure input and corresponding pressure of the pressure input. Thus, pressure detection component 120 may include or be associated with one or more sensors utilized to detect a presence, location, and pressure of a pressure input, including embedded sensors, surface mounted sensors, or otherwise connect sensors. Touch interface component may collect data resulting from a pressure input and provide the data to pressure processing application 130 for processing. The pressure input may correspond to an input applied with a hand, foot, arm, leg, head, or other physical body part of a user, or may be applied using another device or object, such as a glove, stylus device, writing instrument, or other object. Additionally, the pressure input may correspond to a single input, such as a single finger application of pressure, or additional inputs, such as multiple finger inputs. The pressure input may be detected as a single overall input using multiple fingers, a palm, hand, etc., or may be multiple individual inputs. The pressure input may include a time of input or length of input with the applied pressure, as well as a number of inputs over a time period, such as taps over a set time period or within a time period of each tap.

Thus, pressure processing application 130 may correspond to one or more processes to execute software modules and associated devices of communication device 110 to receive raw pressure input data associated with a pressure input applied to a structural component (e.g., pressure detection component 120) of computing device 110 and determine one or more of the pressures applied to pressure detection component 120, the location on pressure detection component 120 where the pressure input took place, the length of the pressure input, the number or series of pressure inputs, and other features or actions associated with entry of the pressure input having the associated pressure amount. In this regard, pressure processing application 130 may correspond to specialized hardware and/or software utilized by a user of communication device 110 receive data from pressure detection component 120 when a pressure input is applied to pressure detection component 120. Pressure processing application 130 may process the raw data to determine a pressure input for an operating system and/or application of communication device 110 (e.g., payment processing application 112). Pressure processing application 130 may further determine an associated pressure for the pressure input. In order to provide detection of a pressure of a pressure input, various features may be utilized with pressure detection component 120, for example, utilizing the features and pressure detection processes associated with a piezoresistive device, a piezoelectric device, a mechanical resistive device, an electromagnetic device, a capacitive variance device, and/or a touch screen or biometric reading device capable of further detecting pressure through an embedded device, size of the pressure input, or other detected data. Thus, pressure processing application 130 may provide determination of pressure applied during a pressure input, as well as other input related data points. Pressure processing application 130 may utilize multiple input data points to determine pressure applied during a pressure input and associated input data (e.g., location, length, pattern, etc.). Pressure processing application 130 may further provide data for the pressure input and pressure amount to applications for processing of the input data (e.g., the pressure input presence, location, pressure, and other information) in the application, for example, to use the pressure input as input data to the application.

Payment processing application 112 may correspond to one or more processes to execute software modules and associated devices of communication device 110 to enter one or more payment instruments or other funding sources for storage in a digital wallet associated with a payment account (e.g., stored and/or serviced by payment provider server 150), access the digital wallet and/or payment account for use, and provide payments to another entity through pressure inputs having a pressure amount detected using pressure detection component 120 with pressure processing application 130. In this regard, payment processing application 112 may correspond to specialized hardware and/or software utilized by a user of communication device 110 that provides an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.) Such information may be stored with payment provider server 150 for use with an online digital wallet and/or payment account. In various embodiments, information for the payment account may also be stored to communication device 110 for use in an offline environment. The payment account accessible through payment processing application 112 may be used to initiate, receive, and/or process/complete transactions using services provided by payment provider server 150. Once entered, the payment instruments may be communicated to payment provider server 150 over network 160 by payment processing application 112 for establishment and/or maintenance/update of the payment account and/or entry into the digital wallet. The user of communication device 110 may also enter benefits to payment processing application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment processing application 112 may be implemented as a user interface enabling the user to select and provide payment. In various embodiments, payment processing application 112 may include a general browser application configured to retrieve, present, and communicate information over the Internet (e.g., utilize resources on the World Wide Web) or a private network. For example, payment processing application 112 may provide a web browser, which may send and receive information over network 160, including retrieving website information (e.g., a website for payment provider server 150), presenting the website information to the user, and/or communicating information to the website, including payment information for payment through payment provider server 150. However, in other embodiments, payment processing application 112 may include a dedicated application of payment provider server 150 or other entity (e.g., a merchant), which may be configured to assist in processing purchase requests.

Payment processing application 112 may be utilized to select payment instrument(s) for use in providing payment for a transaction, transfer, or other financial process. As discussed herein, payment processing application 112 may utilize user financial information, such as a credit card, bank account, or other financial account, as a payment instrument when providing payment information. Additionally, payment processing application 112 may utilize a user account with a payment provider, such as payment provider server 150, as the payment instrument. Selection of a payment instrument may occur prior to, at, or after establishment of the financial process, for example, through pressure inputs having an associated pressure amount. Payment provider server 150 may then use the payment instrument during processing of payment, as discussed herein with respect to payment provider server 150. Payment processing application 112 may be utilized to view the results of payment, for example, using transaction histories, dispute resolution processes, and other post-transaction process. Payment processing application 112 may also store and/or utilize a digital token for the payment account, digital wallet, and/or payment instruments of the user. Thus, payment processing application 112 may provide the digital token to authenticate the user and/or use the user's payment account, digital wallet, and/or payment instruments. Payment processing application 112 may use such a token during transaction processing to authenticate the user and complete transaction processing by providing the token, which may be encrypted and/or provided through a secure channel, to a transaction participant to authenticate the user and/or the user's payment account, digital wallet, and/or payment instruments to payment provider server 150 and allow for transaction processing and payment using the user's payment account, digital wallet, and/or payment instruments.

As discussed herein, payment processing application 112 may receive pressure inputs to pressure detection component 120 of communication device 110. Information may be displayed to a user of communication device 110 by payment processing application 112 using an output display device, including a touch sensitive display screen. In other embodiments, other output devices may also be utilized, such as audio output devices. The user may interact with the information presented to the user through inputs using pressure detection component 120. The inputs may correspond to pressure inputs using a finger, hand, palm, or other body part, as well as stylus type device or other object, including a tap, grip, squeeze, finger motion, pressure with different finger combinations, multiple finger taps, etc., which can cause actions based on a pressure or pressures applied in performing the pressure inputs. For example, a grip with a certain finger/hand placement and/or applied or imparted pressure may initiate one action, while a certain finger/hand placement and/or applied/imparted pressure may indicate a second action. Moreover, changes between pressure inputs, hand/finger placement, hand/finger movement, or other touch or pressure input data point, may cause different and further actions. Such pressure inputs may allow the user to enter information, make selections, and initiate/engage in processes of payment processing application 112. Payment processing application 112 may receive preconfigured pressure inputs, such as a selection, highlighting, application execution, or other application or device process through squeezing communication device 110 (or other structural component comprising pressure detection component 120 of communication device 110), pinching the device, tapping the device, gripping or imparting pressure on select parts of the device, or performing a sequence of other pressure inputs. In further embodiments, the user may establish and setup customized pressure inputs having an associated action to execute when using the pressure inputs. Both preconfigured and customized inputs may be associated with a corresponding pressure to define the process to execute in payment processing application 112 when receiving the pressure input.

Thus, payment processing application 112 may utilize the pressure input and associated data as input data when determining an action or process to execute in payment processing application 112. Using a pressure of the pressure input may provide the input data, for example, the intended input, such as if the user means to select a process, change the process, or initiate another process. In other embodiments, the pressure input may perform processes with another application, for example, an application executing in the background of a system, or with the operating system of communication device 110. Payment processing application 112 may associate various pressure amounts of a pressure input with different actions, including applying force to pressure detection component 120 with low pressure/force to accept a transaction and applying pressure to pressure detection component 120 with high pressure/force to decline a transaction. Accordingly, pressure inputs may have two or more pressure sensitivities that determine a process or action to execute based on the pressure input and the pressure applied to pressure detection component 120 using the pressure input. Additionally, the pressure inputs may have additional parameters and/or data points used to determine the process or action to execute, including hand placement, palm/finger location, length, pattern, etc. Payment processing application 112 may determine the action to execute based on each pressure input and the corresponding pressure. Thus, payment processing application 112 may determine that a first action is executed when a pressure input is provided to pressure detection component 120 with a first pressure, where a second action is executed when the pressure input is provided with a second pressure.

The user may also set the action to execute with each pressure input having an associated pressure. For example, payment processing application 112 may provide a configuration and setup process for processes of payment processing application 112 to execute based on a pressure input having a pressure amount. In this regard, the pressure input settings may have multiple pressures, where each pressure of the motion initiates a different process in payment processing application 112 that is selected by the user for that process. In the transaction processing acceptance/rejection example described above, payment processing application 112 may allow the user to set an amount of pressure required to accept a transaction, where too hard or too soft (e.g., pressure exceeds or is less than a set pressure threshold, including any allowed variations), or otherwise incorrect pressure may cause no action, or may reject the transaction. For example, a first pressure amount of the pressure input of 15 Pa may accept the transaction, while a second pressure amount of 20 Pa may reject the transaction. The pressure inputs may have a range, which may be preset or selectable by the user. Thus, the first pressure input to accept a transaction may allow for pressure between 5-15 Pa, which 0-5 Pa and 15+Pa reject the transaction or cause no effect on transaction processing.

In order to establish the first pressure amount and the second pressure amount, payment processing application 112 may provide a process to enter pressure inputs having a desired pressure by the user. Using the process provided by payment processing application 112, the user may provide a pressure input to pressure detection component 120 with an amount (e.g., 15 Pa). Payment processing application 112 may then associate this pressure amount with the action (e.g., accept the transaction). The user may then further tap the entry field with the amount of pressure (e.g., 30 Pa) for the next action (e.g., reject the transaction). Payment processing application 112 may require a plurality of inputs when setting each pressure amount to establish a variance in pressure applied with a pressure input to select an action for execution (e.g., 5-15 Pa to accept the transaction, where each pressure input was measured from 5-15 Pa). In other embodiments, payment processing application 112 may include a preconfigured or adjustable variance for the pressure input (e.g., 10 Pa difference from the selected pressure amount). The variance may be based on the transaction, e.g., a transaction needing more security or of higher value may require a stricter adherence to the pressure amount than a transaction needing less security or involving a smaller transaction amount.

In various embodiments, payment processing application 112 may allow the user to set actions/processes for a set of pressure inputs, where each of the pressure inputs is associated with an amount or degree of pressure the user applies to pressure detection component 120. The processes may be selected through a menu, entered through computing code, and/or user/device actions recorded by payment processing application 112. Various selectable actions may include transaction acceptance/rejection, a payment amount, a tip amount, a payment contact, or other executable action. For example, an action may correspond to processes such as a payment to a user or a merchant, a setup process to configure the payment application, a review process for a transaction, a refund process to provide a refund to a customer, a transaction dispute process, a transfer process to send a fixed amount of funds, a tip process to provide a tip, and an application process to open the payment application or other application (or display the application on the touch screen). The action may also correspond to an emergency action to execute in the case of an emergency (e.g., a call or emergency message to an authority entity, such as the police). The emergency action may further include a geo-location of the user determined using communication device 110, such as through a GPS locator of communication device 110.

The actions may be used in payment processing application 112, or may be used with other applications of communication device 110. For example, the actions may be processes corresponding to a displayed interface of the payment application or while the payment application is executing (e.g., in a background of the operating system of the payment application). In other embodiments, the actions may be executed with another application (e.g., messaging, email, location/mapping, phone call, media playback, social networking, etc., applications) and/or the communication device 110's operating system. Once the action is established, payment processing application 112 may request that the user enter a pressure input with an associated pressure amount. In other embodiments, no pressure amount is requested. In those embodiments, the user simply applies a desired pressure for a specific action, and the system calibrates and then associates that pressure or pressure range with that action. Thus, the user is able to set the pressure amounts for corresponding actions. The pressure input with the pressure amount may then be associated with the selected action/process so that entry of the pressure input with the pressure amount to payment processing application 112 may cause execution of the action/process. As described above, payment processing application 112 may request the user to perform multiple entries of the pressure input with the pressure amount in order to provide a variance in entry of the pressure input during future use of the pressure input. In various embodiments, the pressure input may correspond to more than a grip, squeeze, tap, or other pressure input that may be applied to pressure detection component 120. For example, entry of a PIN or biometric (e.g., fingerprint) to unlock communication device 110 may be done with a plurality of pressures such that a different action is taken.

One or more of the aforementioned features and/or processes of pressure processing application 130 may be included within payment processing application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment processing application 112 and/or other applications 114, identifiers associated with hardware of communication device 110, or other appropriate identifiers, such as identifiers used for payment/user/device authentication or identification, which may be communicated as identifying communication device 110 to payment provider server 150. Database 116 may include pressure input information for a plurality of pressure inputs having associated pressure/force readings applied during each of the plurality of pressure inputs. Additionally, data for a pressure input entered to pressure detection component 120 may be stored to database 116 for use by one or more applications of communication device 110.

Communication device 110 includes at least one communication module 118 adapted to communicate with merchant device 140 and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 140 may be implemented using any appropriate hardware and software configured for wired and/or wireless communication with communication device 110 and/or payment provider server 150. Although described below as a device, merchant device 140 may correspond to a device, server, or cloud computing architecture to provide sales of items, for example, through an online marketplace accessible over a network connection with merchant device 140 and/or a physical merchant location. Merchant device 140 may further be used to process payments for items and provide incentives for purchase of items and/or advertisement of items to other users. Although a merchant device is shown, the merchant device may be managed or controlled by any suitable processing device. Although only one merchant device is shown, a plurality of merchant devices may function similarly.

Merchant device 140 of FIG. 1 contains a sales application 142, other applications 144, a database 146, and a communication module 148. Sales application 142 and other applications 144 may correspond to processes, procedures, and/or applications executable by a hardware processor, for example, a software program. In other embodiments, merchant device 140 may include additional or different modules having specialized hardware and/or software as required.

Sales application 142 may correspond to one or more processes to execute modules and associated specialized hardware of merchant device 140 that provides an interface and/or online marketplace to sell one or more items offered by a merchant (not shown) associated with merchant device 140, and further provide checkout and payment processes for a transaction to purchase the items for sale from the merchant corresponding to merchant device 140. In this regard, sales application 142 may correspond to specialized hardware and/or software of merchant device 140 to provide a convenient interface to permit a merchant to offer items for sale. For example, sales application 142 may be implemented as an application offering items for sale that may be utilized by the merchant or a merchant employee to enter items selected by a user to a transaction, determine a price for the transaction, and initiate a checkout and payment process for the transaction. In other embodiments, sales application 142 may be accessed by communication device 110 to select the items for sale to the user associated with communication device 110. In certain embodiments, sales application 142 may correspond to a website available over the Internet and/or online content and/or database information accessible through a dedicated application. Thus, sales application 142 may provide item sales through an online marketplace using the website of the merchant. However, in other embodiments, merchant device 140 may be local to a physical merchant location and provide transaction processing processes through interfaces displayed to a merchant or merchant employee at the merchant location.

Sales application 142 may include information for a price for the item, a discount for the item, a price change for the item, and/or other incentives for items and/or with the merchant corresponding to merchant device 140 (e.g., rebates, payments, etc.). Sales application 142 may be used to set and/or determine a benefit or incentive provided to a user of communication device 110. The sales data and other item data may be retrievable by communication device 110 and/or payment provider server 150, such as requestable through an API call, retrievable from a database, and/or scraped from an online resource. The information may be based updated periodically or continuously, such as in real time and information for the item(s) for sale changes.

Sales application 142 may be used to establish a transaction once the user associated with communication device 110 has selected one or more items for purchase. Once a payment amount is determined for the transaction for the item(s) to be purchased, sales application 142 may request payment from the user. Sales application 142 may receive payment processing information, such as a payment and a receipt. In such embodiments, the payment request may be processed, payment provided to the merchant account, and notification of payment (or failure, for example, where there are insufficient user funds) may be sent to sales application 142. The payment may be made by payment provider server 150 on behalf of the user associated with communication device 110. Sales application 142 may then receive the results of the transaction processing, and complete the transaction with the user, for example, by providing the user the items for the transaction or declining the transaction where the user is not authenticated or the transaction is not authorized (e.g., insufficient funds). Various command, information transmissions, and other input to sales application 142 may the user of communication device 110 may be effectuate through use of pressure inputs to a structural component of communication device 110

Merchant device 140 includes other applications 144 as may be desired in particular embodiments to provide features to merchant device 140. For example, other applications 144 may include security applications for implementing server-side security features, programmatic client applications for interfacing with appropriate application programming interfaces (APIs) over network 150, or other types of applications. Other applications 144 may also include email, texting, voice and IM applications that allow a user to send and receive emails, calls, texts, and other notifications through network 150. In various embodiments, other applications 144 may include financial applications, such as banking, online payments, money transfer, or other applications associated with payment provider server 150. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with sales application 142 and/or other applications 144, identifiers associated with hardware of merchant device 140, or other appropriate identifiers, such as identifiers used for payment/user/device authentication or identification. Identifiers in database 146 may be used by a payment/credit provider, such as payment provider server 150, to associate merchant device 140 with a particular account maintained by the payment/credit provider. Item, sales, and/or benefit information for items sold by the merchant associated with merchant device 140 may be stored to database 146. Database 146 may further include transaction information and/or results, including transaction histories.

Merchant device 140 includes at least one communication module 148 adapted to communicate with communication device 110 and/or payment provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 150 may be maintained, for example, by an online service provider, which may provide connection services on behalf of users. In this regard, payment provider server 150 includes one or more processing applications which may be configured to interact with communication device 110, merchant device 150, and/or another device/server to facilitate connecting users having a shared interest. In one example, payment provider server 150 may be provided by PAYPAL®, Inc. of San Jose, Calif., USA. However, in other embodiments, payment provider server 150 may be maintained by or include another type of service provider, which may provide connection services to a plurality of users.

Payment provider server 150 of FIG. 1 includes a transaction processing application 152, other applications 154, a database 156, and a network interface component 158. Transaction processing application 152 and other applications 154 may correspond to executable processes, procedures, and/or applications with associated hardware. In other embodiments, payment provider server 150 may include additional or different modules having specialized hardware and/or software as required.

Transaction processing application 152 may correspond to one or more processes to execute software modules and associated specialized hardware of payment provider server 150 to provide payment services to merchants and users, for example though a payment account and/or payment instruments. In this regard, transaction processing application 152 may correspond to specialized hardware and/or software to provide payment services and payment accounts, including digital wallets storing payment instruments. The payment services may allow for a payment to the merchant by a user through a payment instrument, including a credit/debit card, banking account, payment account with payment provider server 150, and/or other financial instrument. In order to establish a payment account for a merchant and/or user to send and receive payments, transaction processing application 152 may receive information requesting establishment of the payment account. The information may include user personal and/or financial information. Additionally the information may include a login, account name, password, PIN, or other account creation information. The merchant/user may provide a name, address, social security number, or other personal information necessary to establish the account and/or effectuate payments through the account. Transaction processing application 152 may further allow the merchant/user to service and maintain the payment account, for example, by adding and removing payment instruments. Transaction processing application 152 may be used to provide a payment for an item to a merchant, for example, between communication device 110 and merchant device 140 (e.g., using pressure inputs with communication device 110 to effectuate the payment). Transaction processing application 152 may debit an account of the user automatically and provide the payment to an account of the merchant. Transaction processing application 152 may also be used to provide transaction histories for processed transactions. Thus, one or more of the features, processes, and/or account/transaction processing services of transaction processing application 152 may be utilized by the user of communication device 110 through applied pressure inputs to a structural component of communication device 110.

In various embodiments, payment provider server 150 includes other applications 154 as may be desired in particular embodiments to provide features to payment provider server 150. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing payment provider server 160, where the user or other users may interact with the GUI to more easily view and communicate information. In various embodiments, other applications 154 may include connection and/or communication applications, which may be utilized to communicate information to over network 160.

Additionally, payment provider server 150 includes database 156. As previously discussed, the user and/or the merchant may establish one or more digital wallets and/or payment accounts with payment provider server 150. Digital wallets and/or payment accounts in database 156 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 150, e.g., from communication device 110, one or more digital wallets and/or payment accounts belonging to the users may be found. Database 156 may also store the user preferences for an account for the user and/or merchant.

In various embodiments, payment provider server 150 includes at least one network interface component 158 adapted to communicate communication device 110 and/or merchant device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

FIG. 2A is an exemplary setup interface for a pressure detection and/or payment application to utilize pressure inputs for executing, initiating, or performing a process, according to an embodiment. Environment 200a includes a communication device 110 corresponding generally to the described features, processes, and components of communication device 110 in environment 100 of FIG. 1. In this regard, a user utilizing communication device 110 may view an interface 1000 on communication device 110, where interface 1000 corresponds to an interface of a payment processing application, such as payment processing application 112 of communication device 110 in environment 100 of FIG. 1.

In this regard, interface 1000 displays a setup screen to establish pressure inputs for a device. For example, interface 1000 includes a configuration menu 1002 to establish "pressure pay" in order to provide transaction processing through one or more pressure inputs. Thus, a user of communication device 110 may be allowed to select enable option 1004 to enable pressure inputs to perform device actions and processes. Enable option 1004 may include a corresponding activation button 1006, which may be used to enable and disable pressure input detection and use with device actions/processes. If the user selects activation button 1006 for enable option 1004, thereby enabling pressure inputs to one or more applications of communication device 110, the user may be presented with instructions 1008 informing the user of a process to establish a pressure input having a pressure amount. The user is further displayed an instructional image 1010, and, after reviewing, the user may select a proceed option 1012 to set a pressure amount for a pressure input to execute an action/process.

FIG. 2B is an exemplary setup interface for setting a pressure input for use with a process for a pressure detection and/or payment application, according to an embodiment. Environment 200b includes a communication device 110 corresponding generally to the described features, processes, and components of communication device 110 in environment 100 of FIG. 1. In this regard, a user utilizing communication device 110 may view an interface 1100 on communication device 110, where interface 1100 corresponds to an interface of a payment processing application, such as payment processing application 112 of communication device 110 in environment 100 of FIG. 1.

In this regard, interface 1100 displays a setup screen to input a pressure amount for a pressure input for communication device 110. For example, interface 1100 includes a configuration menu 1102 to establish "pressure pay" in order to provide transaction processing through one or more pressure inputs. Thus, a user of communication device 110 may have selected an activation button 1106 to activate an enable option 1104, and may be directed to a setup interface or menu, where the user may enter a pressure input having a pressure amount. For example, pressure input detection display 1108 may display a detected pressure input, such as a pressure amount 1112 of 10 Pa. In various embodiments, pressure input detection display 1108 may also display a fingerprint 1110 where communication device 110 is capable of detecting fingerprints using a structural component of communication device 110 that is pressure sensitive. If the user is satisfied with their pressure input, the user may select a proceed option 1114. Otherwise, the user may re-enter a pressure input.

FIG. 2C is an exemplary setup interface for establishing a pressure input for use with a process for a pressure detection and/or payment application, according to an embodiment. Environment 200c includes a communication device 110 corresponding generally to the described features, processes, and components of communication device 110 in environment 100 of FIG. 1. In this regard, a user utilizing communication device 110 may view an interface 1200 on communication device 110, where interface 1100 corresponds to an interface of a payment processing application, such as payment processing application 112 of communication device 110 in environment 100 of FIG. 1.

In this regard, interface 1200 displays a setup screen to input a pressure amount for a pressure input for communication device 120. For example, interface 1100 may display an interface screen after entry of a pressure input having a pressure amount. For example, interface 1200 includes a configuration menu 1202 to establish "pressure pay" in order to provide transaction processing through one or more pressure inputs. Thus, a user of communication device 110 may have selected an activation button 1206 to activate an enable option 1204, and may be directed to a confirmation interface after entering a pressure input in environment 200b of FIG. 2B. After entry of the pressure input having a pressure amount, the user may receive notification 1208 that pressure inputs have been enabled to allow transaction processing through applying pressure to a structural component of communication device 110. Additionally, interface 1200 may display pressure range 1210 detected for the applied pressure for the set pressure input in order to perform transaction processing, shown as a range between 0-15 Pa. If the user is unsatisfied with pressure range 1210, the user may select reset option 1212 to enter a new pressure amount.

FIG. 2D is an exemplary payment interface utilizing a pressure input to execute a process in a payment application, according to an embodiment. Environment 200d includes a communication device 110 corresponding generally to the described features, processes, and components of communication device 110 in environment 100 of FIG. 1. In this regard, a user utilizing communication device 110 may view an interface 1300 on communication device 110, where interface 1100 corresponds to an interface of a payment processing application, such as payment processing application 112 of communication device 110 in environment 100 of FIG. 1.

Thus, after establishing a pressure input to confirm transaction processing in FIGS. 2A-C, a user 202 may later be holding communication device 110 and receive or generate a transaction with another entity. For example, user 202 may be at a checkout interface 1302, where checkout interface 1302 requests transaction processing for a transaction 1302. Using a hand of user 202, user 202 may apply a pressure to communication device 110 that is between the established pressure range (e.g., pressure range 1210 of FIG. 2C). Thus, through the pressure input, user 202 may provide a payment for transaction cost 1306 utilizing the detected pressure amount of the pressure input.

Figure 2E:
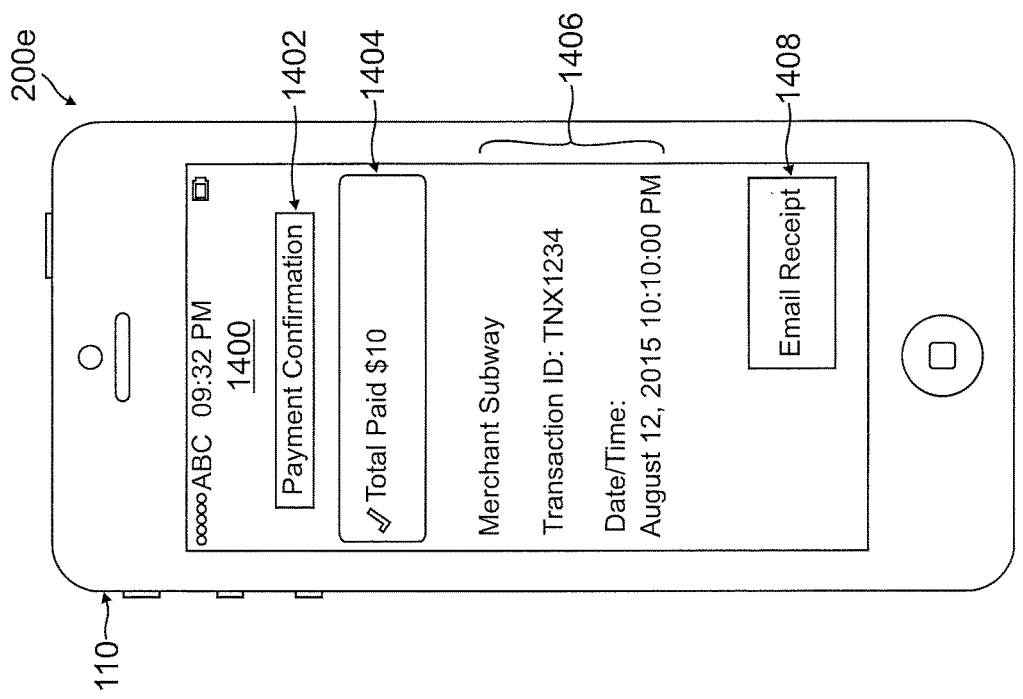
FIG. 2E is an exemplary payment interface after execution of a process in a payment application using a pressure input, according to an embodiment.

FIG. 2E is an exemplary payment interface after execution of a process in a payment application using a pressure input, according to an embodiment. Environment 200e includes a communication device 110 corresponding generally to the described features, processes, and components of communication device 110 in environment 100 of FIG. 1. In this regard, a user utilizing communication device 110 may view an interface 1100 on communication device 110, where interface 1400 corresponds to an interface of a payment processing application, such as payment processing application 112 of communication device 110 in environment 100 of FIG. 1.

After applying a pressure input to a structural component of communication device 110 in FIG. 2D, a user may then view a transaction confirmation and history screen in environment 200e. For example, a payment confirmation 1402 is displayed, having a paid amount 1404 provided to a merchant of transaction 1406 based on the applied pressure. The user may further receive electronic confirmation of transaction 1406 utilizing option 1408.

Figure 3:
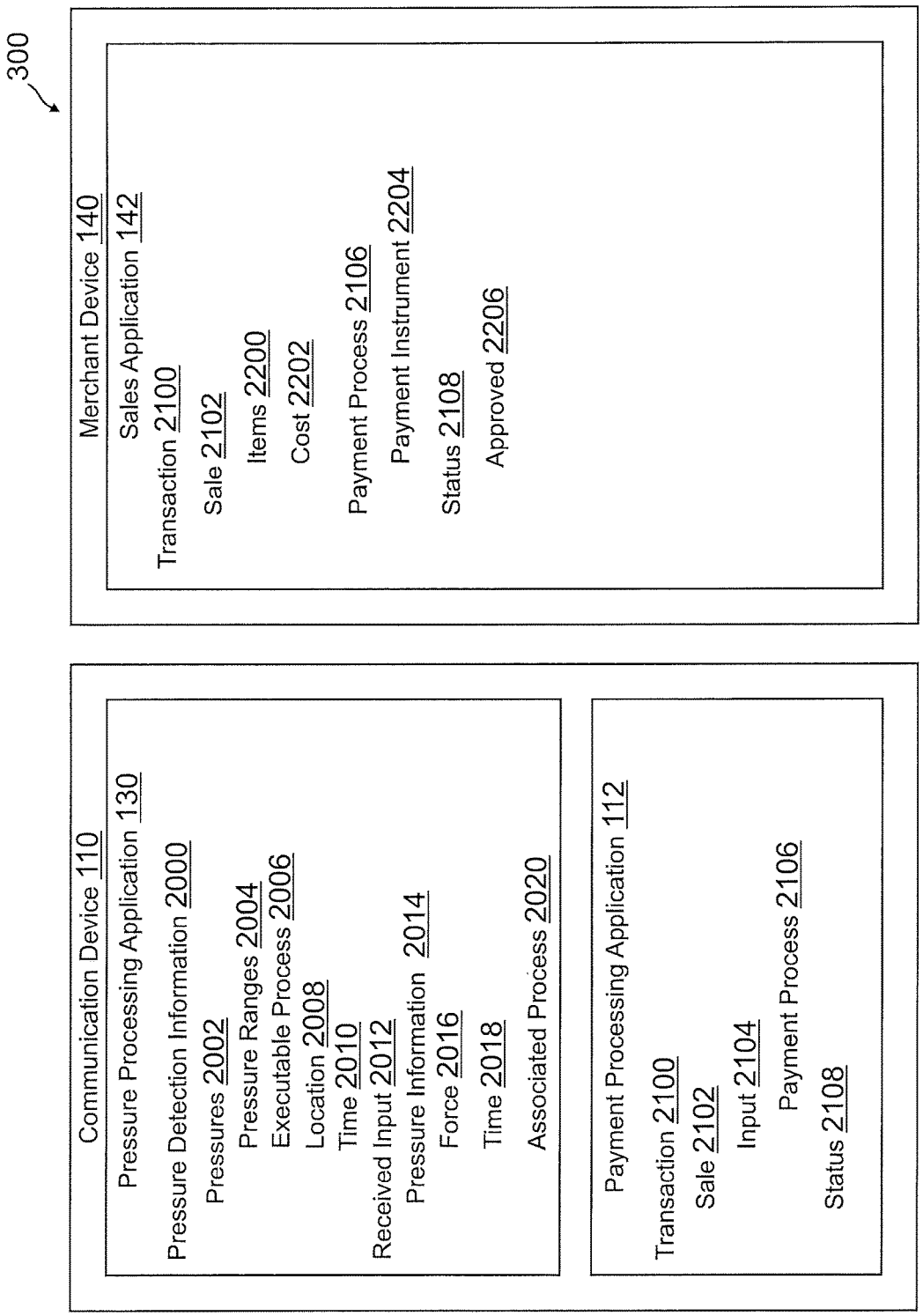
FIG. 3 is an exemplary system environment showing a communication device of a user receiving pressure inputs applied to a device structure and executing processes with a merchant device and a payment provider server based on the pressure inputs, according to an embodiment.

FIG. 3 is an exemplary system environment showing a communication device of a user receiving pressure inputs applied to a device structure and executing processes with a merchant device and a payment provider server based on the pressure inputs, according to an embodiment. FIG. 3 includes communication device 110 and a merchant device 140 all discussed in reference to environment 100 of FIG. 1.

Communication device 110 executes pressure processing application 130 and a payment processing application 112 corresponding generally to the specialized hardware and/or software modules and processes described in reference to FIG. 1. In this regard, pressure processing application 130 includes pressure input information and data for one or more pressure inputs that cause execution of an action or process when received by communication device 110. For example, pressure detection information 2000 may include pressures 2002 that may cause execution of processes and applications on communication device 110. Pressures 2002 may be associated with pressure ranges 2004, as well as executable processes 2006, location 2008, and time 2010, which may each correspond to various data points used to determine information from an applied pressure input. Thus, on input of received input 2012 having pressure information 2014, such as force 2016 and time 2018, an associated process 2020 may be determined.

Payment processing application 112 may receive pressure inputs and/or determined processes from pressure inputs, which may be processed using the information available from pressure processing application 130. For example, payment processing application 112 may include information for a transaction 2100, which may include a sale 2102. Using received input 2012 for a pressure applied to a structural component of communication device 110, an input 2104 for payment processing application 112 may be determined, such as a transaction processing request. Input 2104 may be associated with payment process 2106 for execution based on input 2104. Additionally, based on input 2104, payment processing application 112 may receive a status 2108.

Merchant device 140 executes sales application 142 corresponding generally to the specialized hardware and/or software modules and processes described in reference to FIG. 1. In this regard, sales application 142 may be used to establish and/or process a transaction between communication device 110 and merchant device 140. Thus, sales application 142 includes transaction 2100 between the user of communication device 110 and the merchant of merchant device 140, which may be populated in payment processing application 112 for processing. The processing of transaction 2100 may occur using one or more pressure inputs, such as received input 2012 from communication device 110 that causes input 2104 to payment processing application 112. Transaction 2100 may include sales 2102 having items 2200 and a cost 2202. Additionally, based on input 2104, payment process 2106 may be received from communication device 110 having a payment instrument 2204. Sales application 142 may also be used to view status 2108, such as approved 2206 based on transaction processing.

Figure 4:
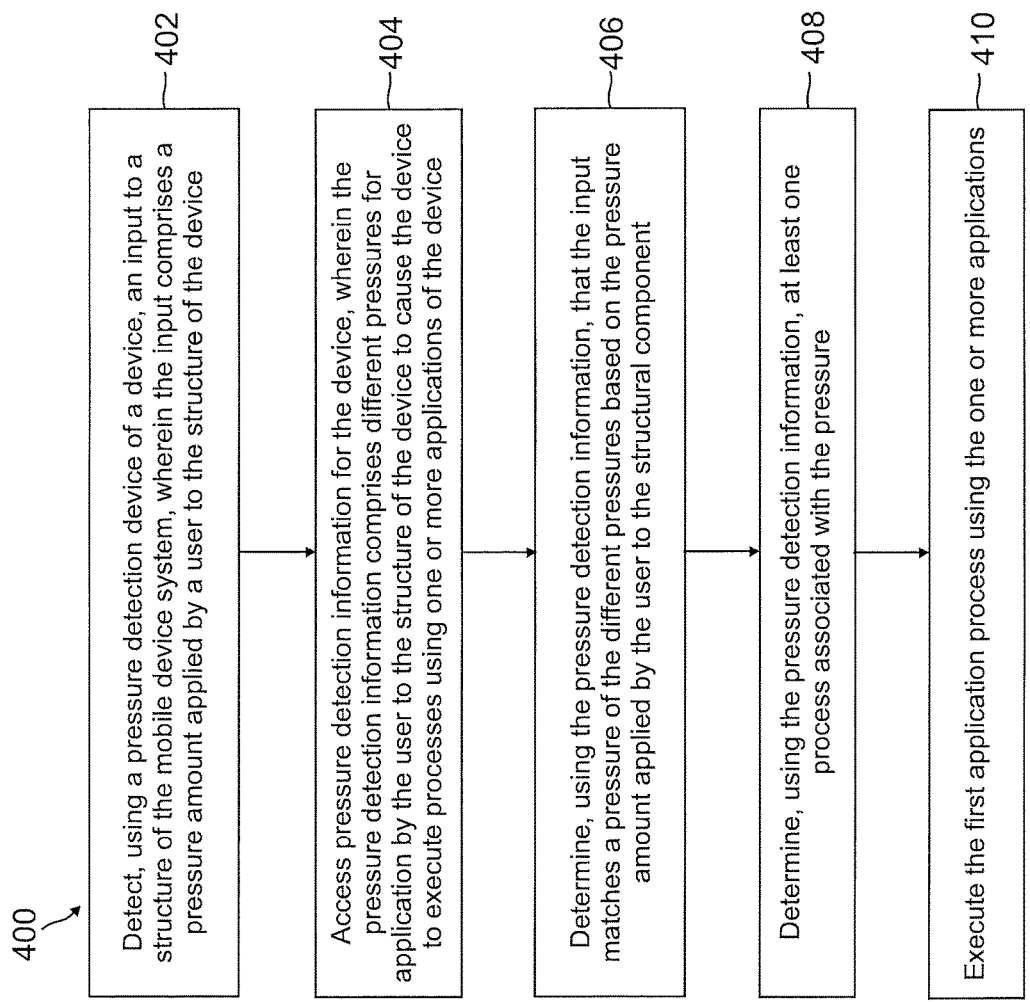
FIG. 4 is a flowchart of an exemplary process for pressure sensitive device casing to cause device functionality, according to an embodiment.

FIG. 4 is a flowchart of an exemplary process for pressure sensitive device casing to cause device functionality, according to an embodiment. Note that one or more steps, processes, and methods described herein may be omitted, performed in a different sequence, or combined as desired or appropriate.

At step 402, an input to a structural component of the mobile device system, is received, from a pressure detection device of the mobile device system, wherein the input comprises a first pressure applied by the user to the structural component of the mobile device system. A non-transitory memory may store pressure detection information comprising at least one pressure for application to a structural component of the mobile device system, wherein the pressure detection information further comprises at least one application process executable within an application of the mobile device system, and wherein the at least one pressure is associated with the at least one application process for execution on detection of the at least one pressure applied by a user to the structural component. The pressure detection device may comprise one of a piezoresistive device, a piezoelectric device, a mechanical resistive device, an electromagnetic device, or a capacitive variance device. The pressure detection device may be mounted in various locations on a circumferential body of the mobile device system. The pressure detection device may comprise a part of a touch screen interface, wherein the touch screen interface comprises at least a side portion of the mobile device system. The computing device may also comprise a wearable computing device or be associated with one.

Thus, at step 404, the pressure detection information is accessed from the non-transitory memory based on the input. The input may further comprise a fingerprint of the user, wherein the pressure detection information is further accessed based on the fingerprint. It is determined that the input matches a first pressure of the at least one pressure based on the first pressure amount to the structural component, at step 406. The input may further comprise a time of pressure of the input, wherein the determining that the input matches the first pressure is further based on the time of pressure of the input. Where there is a time element to the pressure input, the determined pressure amount may be an average pressure over the time or types of variations of the pressure over the time. The input may further comprise a location of imparting the input to a casing of the mobile device, wherein the determining that the input matches the pressure setting is further based on the location. The casing may comprise one of a body of the mobile device, an attachable casing to the mobile device, or a wraparound touch screen interface of the mobile device, wherein the pressure sensor is located in the one of the body, the attachable casing, and the wraparound touch screen interface.

Using the pressure detection information, a first application process associated with the first pressure is determined, at step 408. Thus, the first application process is executed using the application, at step 410. The first application process may comprise a payment process within the application, wherein the application provides a payment amount to one of a user and a merchant based on the first action. The payment process may comprise one of a tip added to a transaction for the user, acceptance of the transaction for processing by the user, sending a payment from the user, sending a transfer from the user, initiating the application on the mobile device system, closing the application on the mobile device system, and authenticating the user for one of the application and an account associated with the application.

The at least one pressure may further comprise a second pressure associated with a second pressure amount, wherein the second pressure is associated with a second application process. Thus, a request to establish the first pressure and the second pressure in the pressure detection information may be received, a first pressure input to the structural component of the mobile device system for the first pressure may be requested with a second pressure input to the structural component of the mobile device system for the second pressure, and the first pressure and the second pressure may be established with the pressure detection information. Additionally, the first pressure and the second pressure may be associated with a first application process and a second application process. The first pressure may between a first pascal (Pa) range set using the first pressure input, wherein the second pressure is between a second Pa range set using the second pressure input. Thus, the input by the user may be within the first Pa range for the first pressure.

Figure 5:
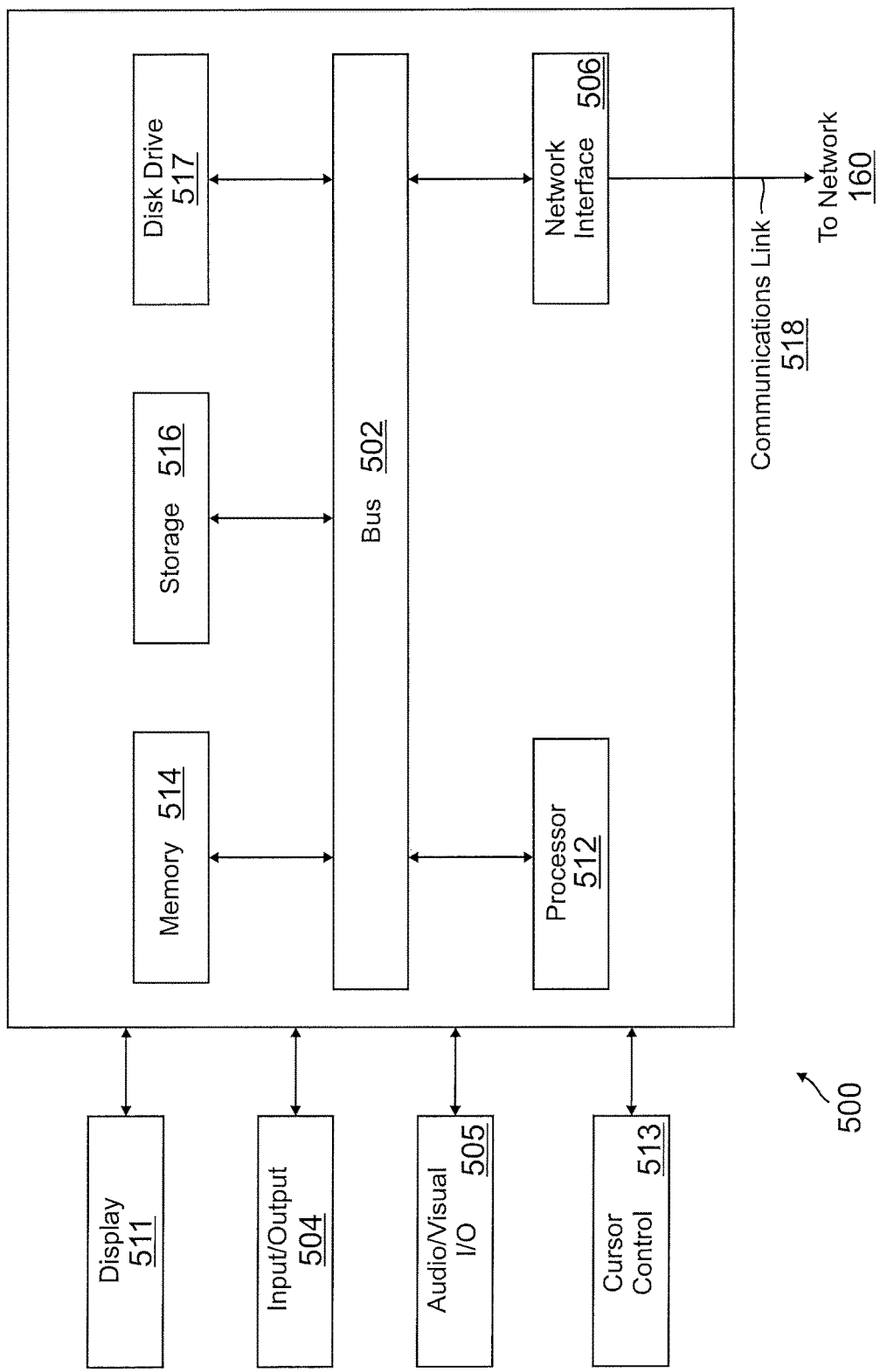
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
a non-transitory memory; and
one or more hardware processors coupled to the non-transitory memory and configured to read instructions from the non-transitory memory to cause the mobile device system to perform operations comprising:
receiving, from a pressure detection device of the mobile device system, a sequence of inputs to a structural casing component of the mobile device system while the mobile device system is operating in a locked state, wherein the sequence of inputs comprises a first number of pressure inputs, a first set of locations on the structural casing component corresponding to the first number of pressure inputs, and a first pressure amount of each of the first number of pressure inputs applied by a user to the structural casing component of the mobile device system;
accessing pressure detection information based on the sequence of inputs, wherein the pressure detection information comprises a first application process executable within a first application of the mobile device system associated with a stored first sequence of inputs applied to the structural casing component;
determining, using the pressure detection information, that the stored first sequence of inputs matches the sequence of inputs applied to the structural casing component;

activating a biometric sensor to obtain biometric data of the user at one of the first set of locations on the structural casing component; and in response to the user being authenticated based on the obtained biometric data, automatically unlocking the mobile device system and executing the first application process in the first application without requiring additional user input to the first application during the first application process.

2. The mobile device system of claim 1, wherein the first application process comprises at least a portion of a payment process within the first application, and wherein the first application provides a payment amount to one of a second user or a merchant based on the first application process.

3. The mobile device system of claim 2, wherein the portion comprises one of adding a tip to a transaction for the user, accepting the transaction for processing by the user, sending a payment from the user, or sending a transfer from the user.

4. The mobile device system of claim 2, wherein the operations further comprise determining the payment amount for the payment process based on the first pressure amount, and wherein executing the first application process comprises performing the payment process based on the determined payment amount.

5. The mobile device system of claim 1, wherein the pressure detection information further comprises a second application process executable within a second application of the mobile device system associated with a stored second sequence of inputs applied to the structural casing component.

6. The mobile device system of claim 5, wherein the stored first sequence of inputs comprises a first pascal (Pa) range encompassing the first pressure amount, and wherein the stored second sequence of inputs comprise a second Pa range different from the first Pa range.

7. The mobile device system of claim 1, wherein the operations further comprise:

receiving a request to associate the stored first sequence of inputs with the first application process within the first application of the mobile device system.

8. The mobile device system of claim 1, wherein the biometric data comprises a fingerprint of the user.

9. The mobile device system of claim 1, wherein the pressure detection device comprises one of a piezoresistive device, a piezoelectric device, a mechanical resistive device, an electromagnetic device, or a capacitive variance device.

10. The mobile device system of claim 9, wherein the pressure detection device is mounted in a circumferential body of the mobile device system.

11. The mobile device system of claim 1, wherein the sequence of inputs further comprises a time of pressure of each of the first number of pressure inputs in the sequence of inputs, and wherein the determining that the stored first sequence of inputs matches the sequence of inputs applied to the structural casing component is further based on the time of pressure of the sequence of inputs.

12. The mobile device system of claim 1, wherein the pressure detection device comprises at least a side portion of the mobile device system.

13. The mobile device system of claim 1, wherein the sequence of inputs comprises a sequence pattern having a length of impartment for each of the first number of pressure inputs to the structural casing component.

14. A method comprising:

receiving, by one or more hardware processors associated with a mobile device from a pressure sensor of the mobile device, a sequence of inputs to a casing of the mobile device while the mobile device is operating in a locked state, wherein the sequence of inputs comprises a number of pressure inputs, a set of locations on the casing of the mobile device corresponding to the number of pressure inputs, and a pressure amount of each of the number of pressure inputs imparted on the casing by a user of the mobile device;

retrieving, by the one or more hardware processors, casing pressure settings for the mobile device based on the sequence of inputs, wherein the casing pressure settings comprise a plurality of pressure settings associated with a plurality of application processes executable within an application of the mobile device;

determining, by the one or more hardware processors using the casing pressure settings, that the sequence of inputs matches a first pressure setting of the plurality of pressure settings based on the number of pressure inputs, the set of locations on the casing, and the pressure amount in the sequence of inputs imparted on the casing;

determining, by the one or more hardware processors using the casing pressure settings, a first application process of the plurality of application processes associated with the first pressure setting;

activating, by the one or more hardware processors, a biometric sensor to obtain biometric data of the user at one of the set of locations on the casing; and in response to the user being authenticated based on the obtained biometric data, automatically unlocking the mobile device and executing the first application process with the application of the mobile device without requiring additional user input to the application during the first application process.

15. The method of claim 14, wherein the first application process is associated with one of a transaction processing process, an emergency call process, a transaction approval process, an authentication process, or an application initiation process.

16. The method of claim 14, wherein the casing comprises one of a body of the mobile device or an attachable casing to the mobile device, and wherein the pressure sensor is located in the one of the body or the attachable casing.

17. The method of claim 14, wherein the first application process comprises an electronic payment process, wherein the method further comprises determining a payment amount for the electronic payment process based on the pressure amount of the number of pressure inputs applied to the casing by the user, and wherein executing the first application process comprises performing the electronic payment process based on the determined payment amount.

18. A non-transitory machine-readable medium having stored thereon machine-readable instructions executable to cause a device to perform operations comprising:

detecting, using a pressure detection device of the device, a sequence of inputs to a casing component of the device while the device is operating in a locked state, wherein the sequence of inputs comprises a number of pressure inputs, a first set of locations on the casing component corresponding to the number of pressure inputs, and a pressure amount of each of the number of pressure inputs applied by a user to the casing component of the device;

accessing pressure detection information for the device based on the sequence of inputs, wherein the pressure detection information comprises different pressure settings associated with different application processes executable using an application of the device;

determining, using the pressure detection information, that the sequence of inputs matches a first pressure setting of the different pressure settings based on the number of pressure inputs, the first set of locations on the casing component, and the pressure amount applied by the user to the casing component;

determining, using the pressure detection information, a first application process of the different application processes associated with the first pressure setting;

activating a biometric sensor to obtain biometric data of the user at one of the first set of locations on the casing component; and in response to the user being authenticated based on the obtained biometric data, automatically unlocking the device and executing the first application process using the application without requiring additional user input to the application during the first application process.

19. The non-transitory machine-readable medium of claim 18, wherein the device comprises a wearable computing device.

20. The non-transitory machine-readable medium of claim 18, wherein the first application process comprises an electronic payment process, wherein the operations further comprise determining a payment amount for the electronic payment process based on the pressure amount of the number of pressure inputs imparted on the casing component by the user, wherein executing the first application process comprises performing the electronic payment process based on the determined payment amount.

* * * * *

UNITED STATES PATENT AND TRADEMARK OFFICE
CERTIFICATE OF CORRECTION

PATENT NO.         : 10,346,825 B2
APPLICATION NO.    : 15/193643
DATED              : July 9, 2019
INVENTOR(S)        : Pankaj Sarin It is certified that error appears in the above-identified patent and that said Letters Patent is hereby corrected as shown below:

In the Specification

In Column 8, Line 2, change "GOGGLE" to --GOOGLE--

Signed and Sealed this
Fifth Day of November, 2019

Andrei Iancu
*Director of the United States Patent and Trademark Office*